No. 820,324. PATENTED MAY 8, 1906.
J. E. TAYLOR.
NUT LOCK.
APPLICATION FILED NOV. 16, 1905.
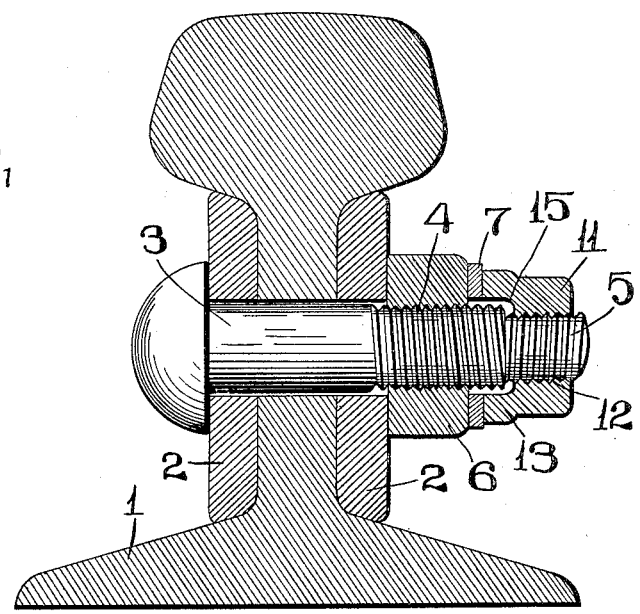
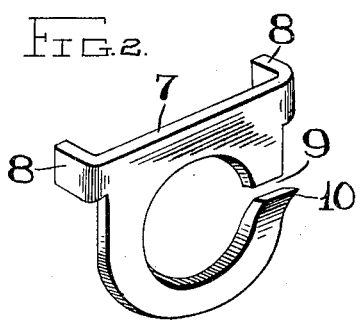
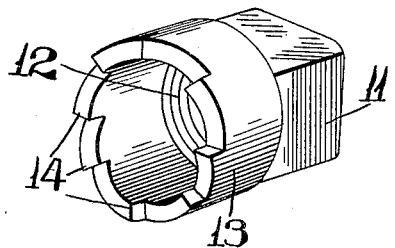
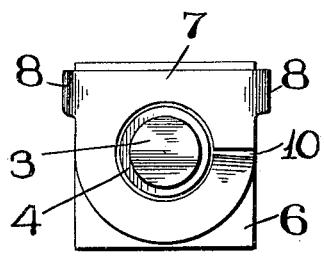
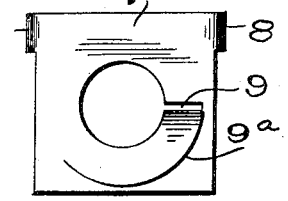
ATTEST:
E. M. Harrington
H. G. Fletcher
INVENTOR
JAMES E. TAYLOR.
By Higdon & Longan ATT'YS

UNITED STATES PATENT OFFICE.

JAMES E. TAYLOR, OF SANDOVAL, ILLINOIS, ASSIGNOR OF ONE-HALF TO SHERMAN DODGE, OF SANDOVAL, ILLINOIS.

NUT-LOCK.

No. 820,324.  Specification of Letters Patent.  Patented May 8, 1906.

Application filed November 16, 1905. Serial No. 287,733.

*To all whom it may concern:*

Be it known that I, JAMES E. TAYLOR, a citizen of the United States, and a resident of Sandoval, Marion county, Illinois, have invented certain new and useful Improvements in Nut-Locks, of which the following is a specification containing a full, clear, and exact description, reference being had to the accompanying drawings, forming a part hereof.

My invention relates to a nut-lock; and the object of my invention is to provide simple inexpensive attachments to bolts whereby the nuts located thereon are very securely locked against accidental removal due to vibration of the parts to which the bolt and nut are attached.

To the above purposes my invention consists in certain novel features of construction and arrangement of parts, which will be hereinafter more clearly set forth, pointed out in my claims, and illustrated in the accompanying drawings, in which—

Figure 1 is a vertical section taken through a railway-rail and showing my improved nut-lock in position on the bolt that passes through said rail and the fish-plates. Fig. 2 is a perspective view of a washer I make use of in carrying out my invention. Fig. 3 is a perspective view of a lock-nut that is positioned on the outer end of the bolt and which engages the washer seen in Fig. 2. Fig. 4 is an elevation of the washer applied to a nut. Fig. 5 is a front elevation of a modified form of the washer I make use of in carrying out my invention.

Referring by numerals to the accompanying drawings, 1 indicates the rail, 2 the fish-plates thereon, and 3 the bolt which passes through said rail and fish-plates in the usual manner. The periphery of the end of this bolt opposite from the head is provided with the usual right-hand thread 4, and the extreme outer end of said bolt is reduced in diameter, and this reduced portion is provided with a left-hand thread 5.

6 indicates a nut of ordinary construction which is adapted to be seated on the portion of the bolt provided with the right-hand screw-thread, and said nut is tightened against the fish-plate in the usual manner.

7 indicates a washer that is adapted to fit against the outer face of the nut 6, and it is provided on its side edges with integral rearwardly-projecting lips 8, that engage against the side faces of the nut 6 adjacent the top thereof. The washer 7 is split at one side, as indicated by 9, and the portion just below this split is bent outwardly a slight distance to form a projecting lip 10.

A locking-nut 11, provided with an interiorly-arranged left-hand thread 12, is adapted to be screwed onto the end of the bolt 3, that is provided with the left-hand thread 5, and formed intergal with the rear end of this nut 11 is a cylindrical head 13 of such a size as that it will readily pass over the outer end of the portion of the bolt 3 that is provided with the right-hand thread 4. The rear face of the cylindrical portion 13 is provided with a series of teeth 14, which are so arranged as that they will engage against the outwardly-turned lip 10 of the washer 7 when the locking-nut is screw-seated on the outer end of the bolt 3. There is a shoulder 15 formed on the interior of the portion 13 at the point where the same joins with the locking-nut 11, and said portion 13 is of such a diameter as that it readily clears the right-hand thread 4 on the bolt 3 when the lock-nut is being screwed into position.

In positioning the parts of my improved lock-nut the washer 7 is placed against the outer face of the nut 6 after the same has been tightened, and then the lock-nut 11 is screwen into position on the left-hand thread 5 on the outer end of the bolt 3. As said lock-nut is tightened the teeth 14 will ride past the lip 10 of the washer 7 until the parts are tightened, and said lip will very effectually prevent the lock-nut from unscrewing from the end of the bolt 3, and the washer 7 will be held against rotation by the engagement of the lips 8 on the sides of the nut 6. Thus the parts are very rigidly locked together, and the nut 6 is prevented from turning after it has been properly seated. When it is desired to remove the lock-nut and the ordinary nut 6 from the bolt, the ears 8 are cut from the washer 7 by means of a cold-chisel or other suitable tool, and when this has been accomplished the washer and lock-nut 11 can readily be removed to allow the removal of the ordinary nut 6.

A nut-lock of my improved construction is simple, inexpensive, easily applied for use, and is adapted for structural steel and bridge work, for use on railway-rails, and upon all machines generally. By tightening the nut 11 the parts are automatically locked together, and when it is desired the ears may be readily cut from the washer in order to release the parts of the nut-lock.

In the modification shown in Fig. 5 the washer is made perfectly square, and the split 9 does not extend all the way to the side of the washer. A curved slit 9ª is formed in the washer concentric with the opening therein, one end of which slit unites with the horizontal slit 9, and thus a spring-finger is formed the upper end of which is bent outwardly to form a tooth to be engaged by the teeth of the cylindrical portion 13.

I claim—

In a nut-lock, the combination with a bolt provided with a right-hand-threaded portion and a left-hand-threaded portion, of a nut located on the right-hand-threaded portion, a washer positioned against the face of said nut, rearwardly-projecting ears integral with the upper corners of said washer for engaging the sides of the nut, a spring-lip integral with and projecting forwardly from the face of the washer, a lock-nut constructed to be positioned on the left-hand-threaded portion of the bolt, a cylindrical head integral with the rear side of the lock-nut, and there being a series of teeth formed on the rear face of the cylindrical head to be engaged by the spring-lip of the washer when the lock-nut is tightened; substantially as specified.

In testimony whereof I have signed my name to this specification in presence of two subscribing witnesses.

JAMES E. TAYLOR.

Witnesses:
V. V. HAWLEY,
C. W. NELSON.